US012628057B2

(12) United States Patent
Jain et al.

(10) Patent No.: US 12,628,057 B2
(45) Date of Patent: May 12, 2026

(54) PROCESSING A MOBILE TERMINATED PAGE RECEIVED DURING RESELECTION

(71) Applicant: QUALCOMM Incorporated, San Diego, CA (US)

(72) Inventors: Mukeshkumar Jain, San Diego, CA (US); Daniel Amerga, San Diego, CA (US); Kuo-Chun Lee, San Diego, CA (US); Jeongho Seo, San Diego, CA (US); Karthik Venkatram, San Diego, CA (US); Mitul Vohra, Hyderabad (IN); Balakrishna Yanamadala, San Diego, CA (US); Sammy Souaiaia, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 523 days.

(21) Appl. No.: 18/067,196

(22) Filed: Dec. 16, 2022

(65) Prior Publication Data

US 2024/0205880 A1     Jun. 20, 2024

(51) Int. Cl.
*H04W 36/08*      (2009.01)
*H04W 68/00*      (2009.01)

(52) U.S. Cl.
CPC ........... *H04W 36/08* (2013.01); *H04W 68/00* (2013.01)

(58) Field of Classification Search
CPC .............................. H04W 36/08; H04W 68/00
See application file for complete search history.

(56) References Cited

U.S. PATENT DOCUMENTS

2013/0017822 A1*   1/2013   Oh .......................... H04W 8/18
                                                           455/423
2022/0022177 A1*   1/2022   Xing ...................... H04W 72/51
2024/0373477 A1*   11/2024   Ingale ................. H04W 60/005

* cited by examiner

*Primary Examiner* — Justin Y Lee
(74) *Attorney, Agent, or Firm* — Patterson + Sheridan, L.L.P.

(57)          ABSTRACT

Certain aspects of the present disclosure provide a method for wireless communications at a user equipment (UE), generally including obtaining a mobile terminated (MT) paging message and performing one or more actions to prioritize processing the MT paging message when one or more reselection criteria for performing a reselection procedure from a first cell to a second cell are met.

12 Claims, 11 Drawing Sheets

600

500

| UE | Cell 1 (Serving) | Cell 2 (Neighbor) |

510

Reselection Criteria Met

MT Paging

Process Reselection Procedure (Page Aborted)

MT Paging reception collides with Reselection Procedure

515

Reselection Procedure Fails

Call is missed, Since page was aborted

600

UE

Cell 1
(Serving)

Cell 2
(Neighbor)

610

Reselection Criteria Met

Process
Reselection
Procedure

MT Paging

MT Paging reception
collides with Reselection
Procedure

615

Perform one or more actions
to prioritize processing the MT
paging message

700

| | NR | LTE | |
|---|---|---|---|
| Case 1 | -95 | -90 | Both serving and neighbor cell are in good condition |
| Case 2 | -105 | -103 | Both serving and neighbor cell are in bad condition |

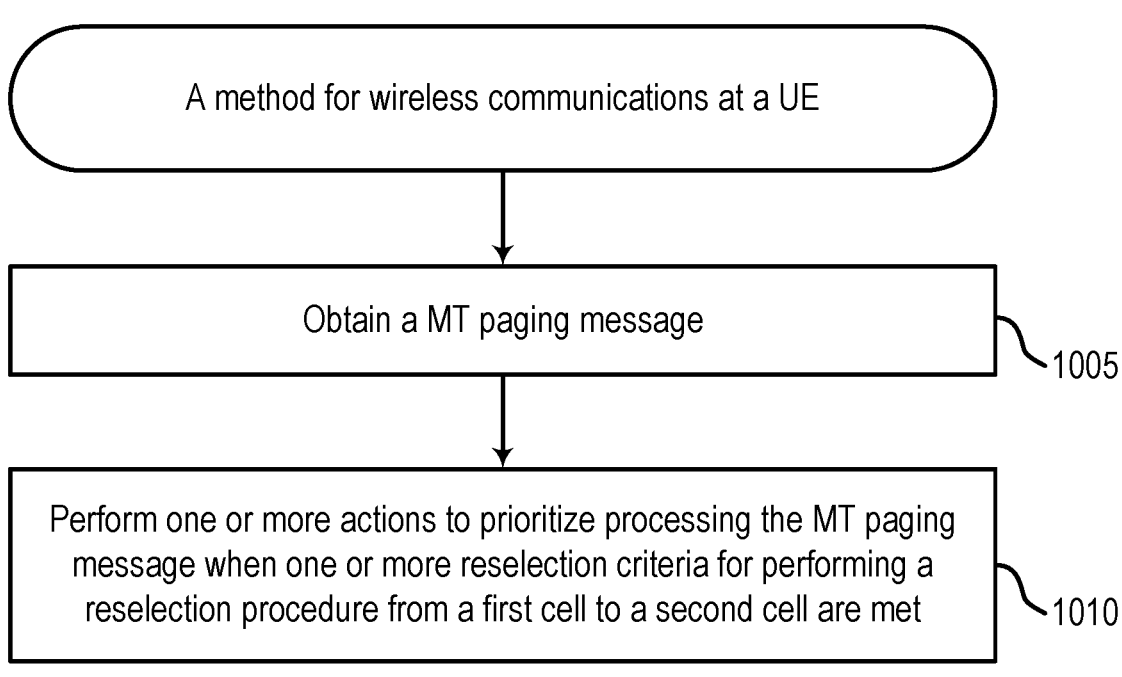
A method for wireless communications at a UE
Obtain a MT paging message
1005
Perform one or more actions to prioritize processing the MT paging message when one or more reselection criteria for performing a reselection procedure from a first cell to a second cell are met
1010
 1000
*FIG. 10*

PROCESSING A MOBILE TERMINATED PAGE RECEIVED DURING RESELECTION

BACKGROUND

Field of the Disclosure

Aspects of the present disclosure relate to wireless communications, and more particularly, to techniques for processing paging messages.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communications at a user equipment (UE). The method includes obtaining a mobile terminated (MT) paging message; and performing one or more actions to prioritize processing the MT paging message when one or more reselection criteria for performing a reselection procedure from a first cell to a second cell are met.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIG. 7 depicts an example of scenarios in which aspects of the present disclosure may be applied.

FIG. 10 depicts a method for wireless communications.

DETAILED DESCRIPTION

Aspects of the present disclosure provide apparatuses, methods, processing systems, and computer-readable mediums for processing paging messages.

Paging generally refers to a mechanism in which a network informs a user equipment (UE) of available information for the UE (e.g., emergency information or a phone call). In certain scenarios, paging messages may be successfully received by a UE, but not processed.

One such scenario is if a paging message is received during a cell reselection procedure. Typically, in such cases, the cell reselection procedure may be prioritized and the paging message discarded. Unfortunately, in the event the reselection procedure is processed, but fails (and the UE remains in the current serving cell), there may be no more paging to the UE by the network in the next paging occasion(s). In this situation, even though the paging message was received successfully, due to prioritization of the reselection procedure, the end user is impacted and misses the call, leading to poor user experience.

Aspects of the present disclosure, however, provide various mechanisms that may help better handle a paging message and reselection procedure collision. In some cases, a UE may be configured to perform one or more actions to prioritize processing a paging message when one or more reselection criteria for performing a reselection procedure from a first cell to a second cell are met. For example, the UE may prioritize processing the paging message over the reselection procedure and/or could buffer the paging message for later processing.

The mechanisms proposed herein may enable a UE to honor a received paging message and alert a user, which may prevent a call from being missed and result in an improved user experience.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

Figure 1:
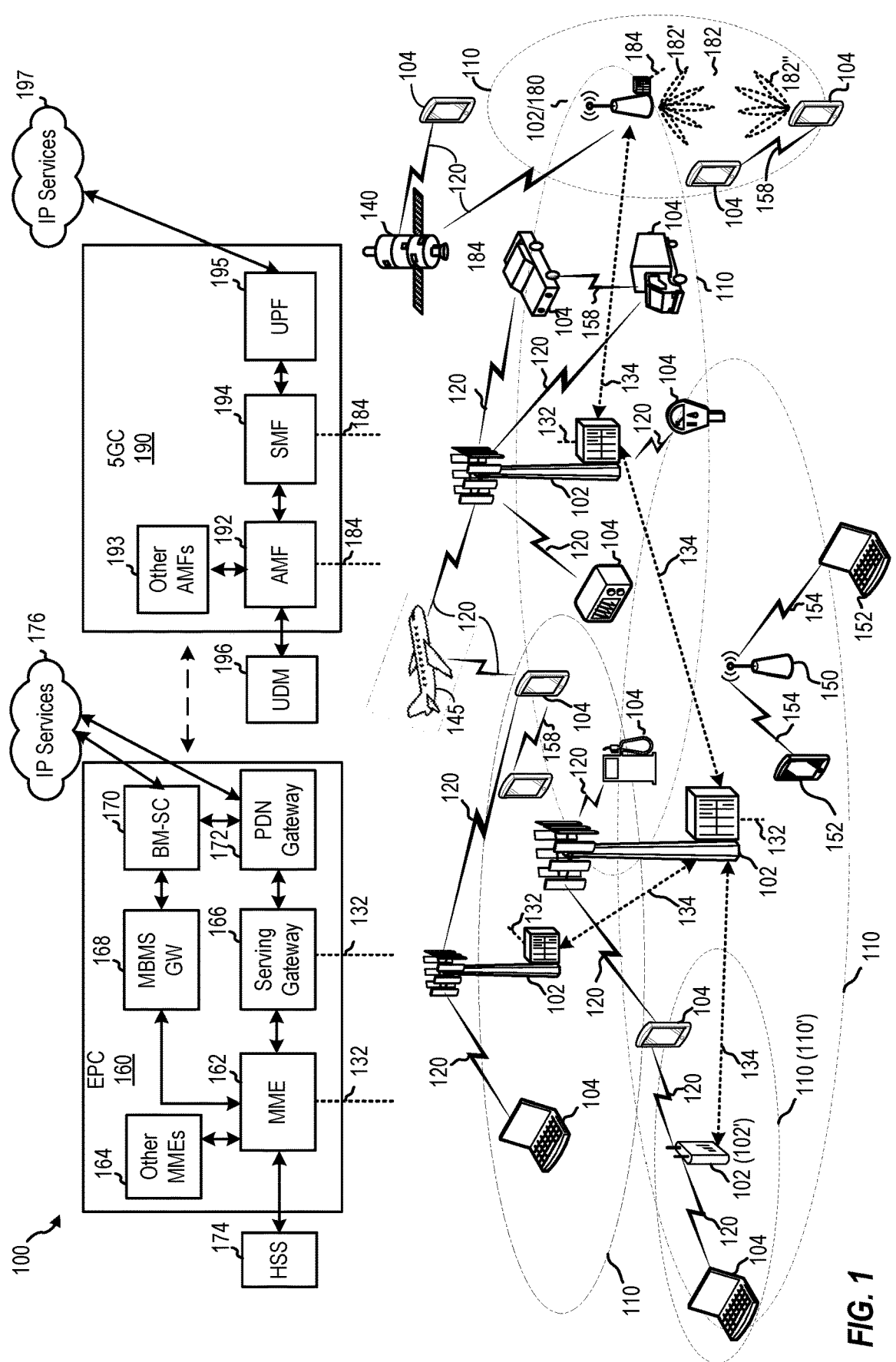
FIG. 1 depicts an example wireless communications network.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IOT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
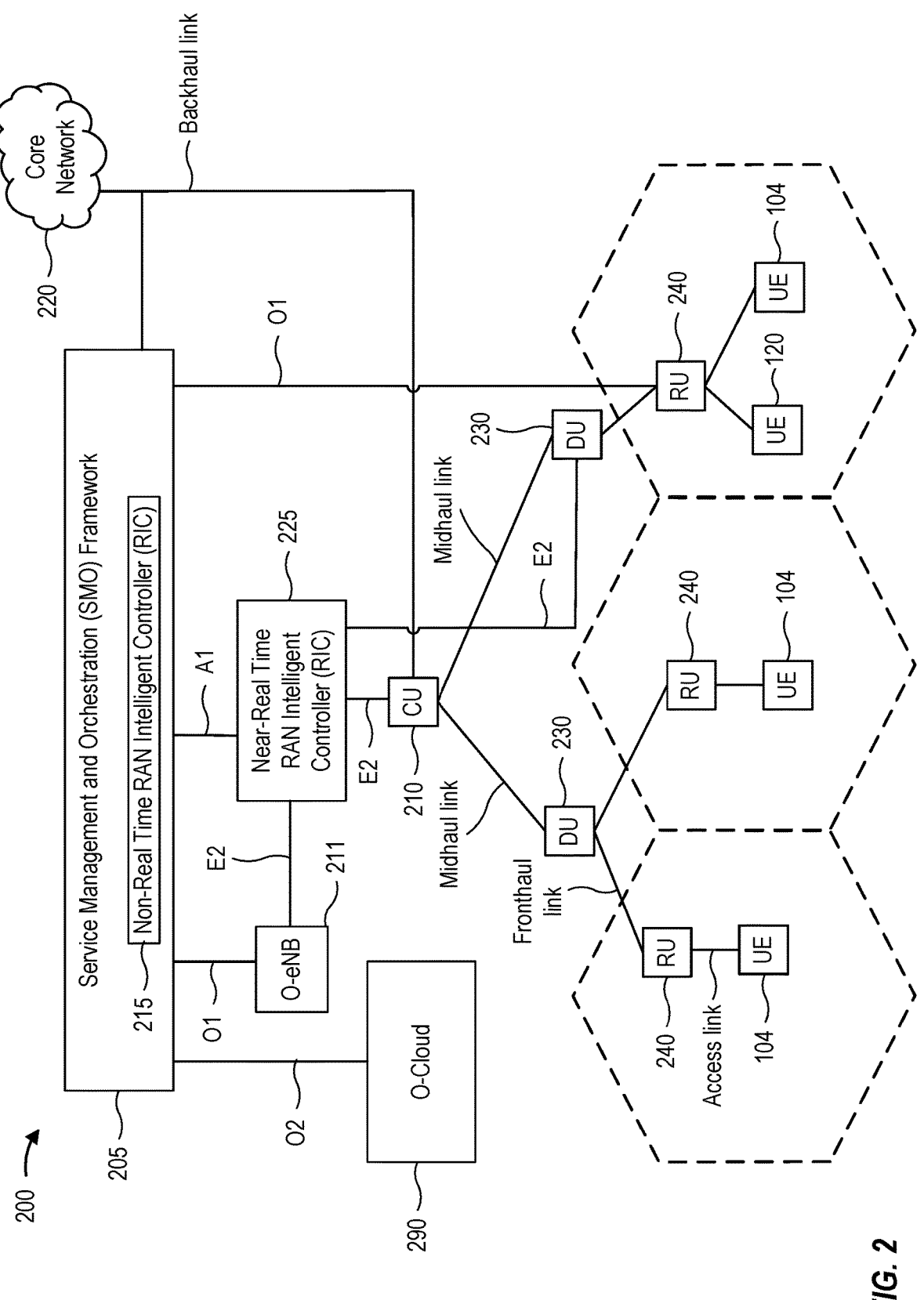
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUS), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHZ, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QOS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
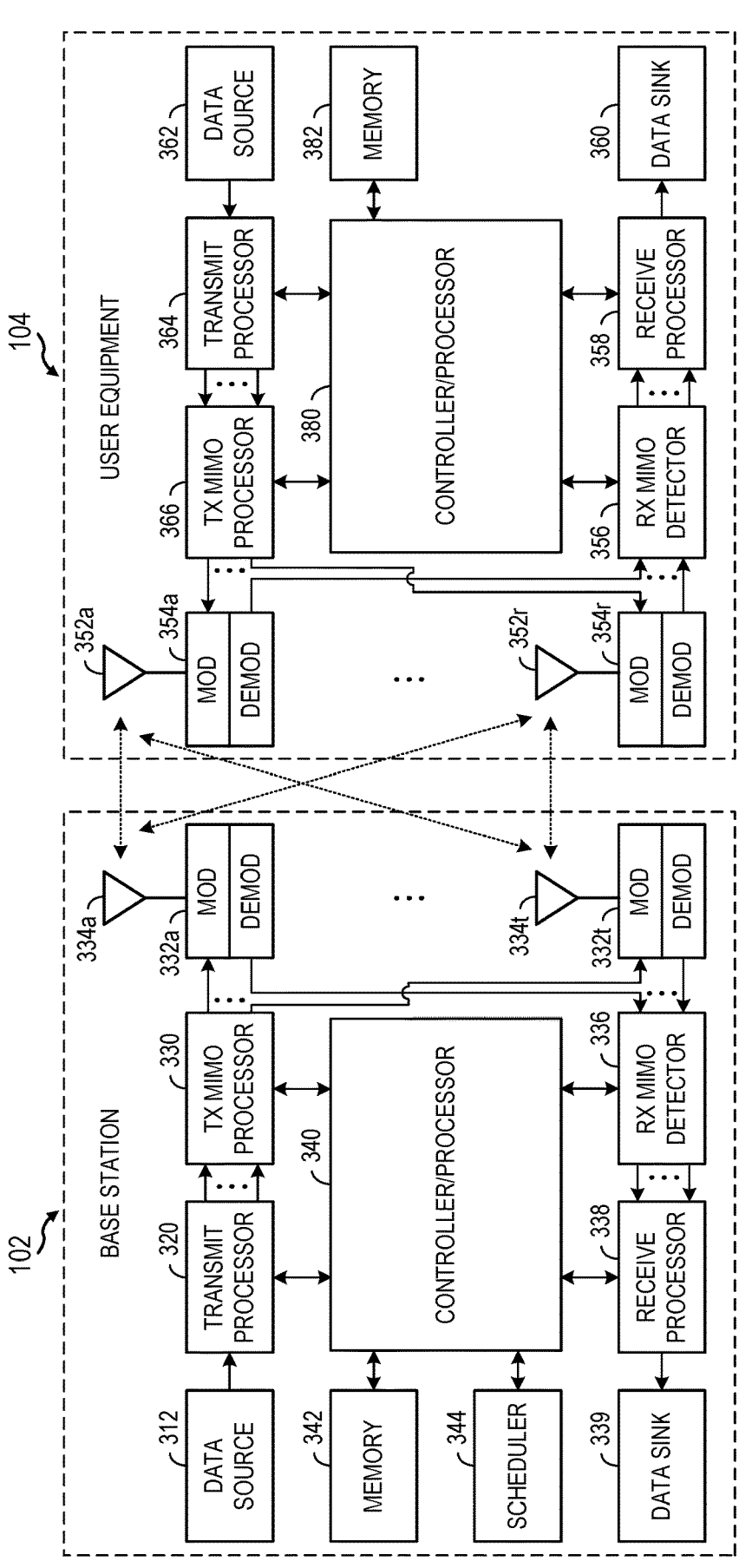
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334$a$-$t$ (collectively 334), transceivers 332$a$-$t$ (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352$a$-$r$ (collectively 352), transceivers 354$a$-$r$ (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figure 4:
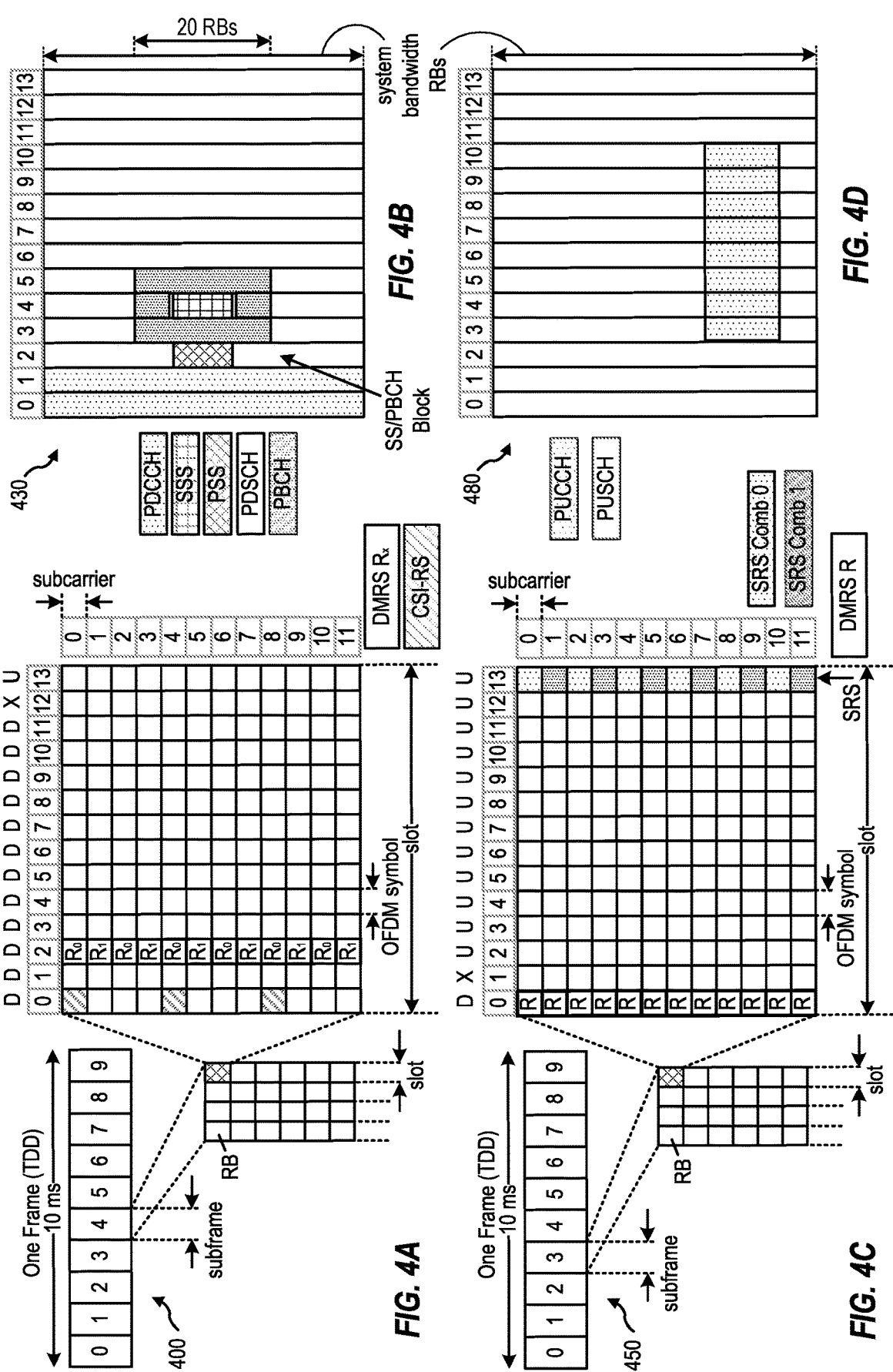
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where Dis DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology u, there are 14 symbols/slot and 2u slots/subframe. The subcarrier spacing and symbol length/duration are a function of the numerology. The subcarrier spacing may be equal to $2^\mu \times 15$ kHz, where u is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Overview of Collision of MT Page Received During Reselection

As noted above, paging generally refers to the mechanism in which a network informs a UE of available information for the UE. In order to conserve power, a UE may enter a power saving state. While in the power saving state, the UE is not monitoring paging and consequently becomes unreachable for mobile terminated (MT) services.

Therefore, the UE may exit from a low power state (e.g., idle mode) to monitor for paging messages (e.g., MT paging messages) during a periodic paging cycle. In a paging cycle, the UE may monitor for a PDCCH in order to check for the presence of a paging message. If the PDCCH indicates that a paging message is transmitted, the UE then needs to decode the page in order to determine if the paging message is directed to it (paging messages can be UE specific or for all UEs camped on the cell). Assuming the paging message is directed toward the UE, the UE may then take appropriate action to process paging message.

Cell reselection generally refers to a mechanism designed to move a UE between cells in order to keep the UE in sufficient coverage (e.g., to be reachable by paging messages). A primary purpose of cell reselection, regardless of whether the reselection involves intra-frequency, inter-frequency, or inter-RAT cells, is to ensure that the UE is camped on (e.g., served by) a best (or better) cell in terms of radio conditions. For example, in LTE, the UE may find and select a cell to camp on based on reference signal (RS) measurements in the current serving cell and neighbor cells. Once a search and measurement procedure is completed, if certain criteria are met, the UE may proceed with cell reselection.

The exact criteria may be depend on a particular scenario or type of cell reselection being performed. For example, intra-frequency cell reselection may be based on a ranking of the cells (per measurements), inter-frequency cell reselection may be based on priorities where a UE attempts to camp on a highest priority frequency available, while inter-RAT cell reselection may be based on relative radio conditions between two distinct RATs with coverage areas overlapping the UE.

Cell reselection may be based upon cell level and/or beam level measurements. Priorities for cell reselection may also be provided by dedicated signaling. For example, priorities for different NR or inter-RAT frequencies may be provided to the UE in the RRCRelease message. The RR(Release may provide the NR or inter-RAT frequencies without providing any priority information. In 5G NR, a cellReselectionServingFreqInfo structure may provide parameters such as threshold settings for inter-frequency and inter-RAT measurements, as well as priority information. Similarly, an intraFreqCellReselectionInfo structure may contain cell reselection information (e.g. the minimum received threshold level) for intra-frequency cell reselection within a current NR cell.

In some cases, a potential issue may arise when a MT paging message is received during a reselection procedure. An example of this scenario is illustrated in the call flow diagram 500 of FIG. 5. In the illustrated example, a UE is served by a first cell (Cell 1), when reselection criteria are met (at 510) triggering a reselection procedure, to reselect to a second cell (Neighbor Cell 2). In the illustrated example, the UE receives an MT paging message during the reselection procedure.

This scenario, or any case where an MT paging message has been received but not processed before a reselection procedure is triggered or completed, may be referred to as a collision (between processing the MT paging message and processing the reselection procedure).

Figure 5:
FIG. 5 depicts an example call flow diagram.

As illustrated in FIG. 5, in conventional UE processing, the UE would discard the MT paging message and prioritize the reselection procedure. This may result in the UE missing an MT paging message (and a corresponding call). As an example, if the UE is in poor NR and LTE coverage when it receives an MT page, the cell reselection procedure may be about to start and, in such cases, a conventional UE would prioritize reselection and the received page would be aborted.

In the event the reselection procedure is processed, but fails (and the UE remains in the current serving cell) as shown at 515, there may be no more paging to the UE by the network in the next paging occasion(s). In this situation even though the MT page was received successfully, due to prioritization of the reselection procedure, the end user is impacted and misses the call, leading to poor user experience.

Aspects Related to Prioritizing MT Page Received During Reselection

Aspects of the present disclosure, however, provide various mechanisms that may help better handle an MT paging message and reselection collision.

The mechanisms described herein may help optimize UE behavior in various types of reselection scenarios. For example, the mechanisms described herein may help a UE handle an MT paging reception collision with an inter-RAT reselection procedure from NR to LTE (NR2L) in poor RF conditions. As will be described in greater detail below, processing the MT paging message may be prioritized, which may help avoid missing calls, thereby resulting in an improved user experience.

While the mechanisms proposed herein are described, in some cases, in the context of NR2L, the mechanisms may be applied in a variety of other scenarios, such as intra-RAT reselection (e.g., NR to NR reselection). As an example, the mechanisms may be applied where a serving cell uses time division duplexing (TDD) and a target cell uses frequency division duplexing (FDD), or vice-versa. As another example, the mechanisms may be applied where the serving cell operates within a first frequency range (e.g., FR1) and the target cell operates within a second FR (e.g., FR2).

The mechanisms proposed herein may help optimize UE behavior in situations where cell reselection and MT paging reception collision occurs, for example, in poor RF conditions.

Figure 6:
FIG. 6 depicts an example call flow diagram for processing paging messages, in accordance with aspects of the present disclosure.

The mechanisms proposed herein for handling cell reselection and MT paging reception collision may be understood with reference to the call flow diagram 600 of FIG. 6.

The network entities (e.g., for Cell 1 and Cell 2) depicted in FIG. 6 may be examples of a network entity, such as the BS 102 depicted and described with respect to FIGS. 1 and 3 or a disaggregated base station depicted and described with respect to FIG. 2. Similarly, the UE depicted in FIG. 6 may be an example of UE 104 depicted and described with respect to FIGS. 1 and 3.

As illustrated, at 610, one or more cell reselection criteria may be met. For example, the UE may be in a poor RF condition in the serving cell (Cell 1) and measurements may indicate coverage would be better in a neighbor cell (e.g., Cell 2). While the mechanisms proposed herein are described, in some cases, in the context of NR2L, the mechanisms may be applied in a variety of other scenarios, such as intra-RAT reselection (e.g., NR to NR reselection). As noted above, Cell 1 and Cell 2 could be different RATs (e.g., NR and LTE), use different types of duplexing (TDD and FDD), and/or may operate on different frequency ranges (e.g., FR1 and FR2).

Rather than discard the MT paging message, as shown in the example of FIG. 5, in this case, the UE may perform one or more actions to prioritize processing the MT paging message (as shown at 615). For example, as will be described in greater detail below with reference to FIGS. 8 and 9, the UE may prioritize processing the paging message over the reselection procedure and/or could buffer the paging message for later processing.

Thus, in the event the reselection procedure fails, the MT paging message may still be processed, which may allow a user to be alerted, avoid missing a call, and improve user experience.

As noted above, in some cases, the UE may prioritize processing the MT paging message over performing the reselection procedure. In some cases, the UE may evaluate RF conditions in both the serving and neighbor cell and prioritize processing the MT paging message over performing the reselection procedure in certain cases.

The UE may identify such cases, by comparing a first RF metric for the serving cell with a second RF metric for the neighbor cell. If the first RF metric is within a first threshold value of the second RF metric, the UE may process the MT paging message and terminate the reselection procedure. Examples of RF metrics could be one or more of reference signal received power (RSRP), signal to interference and noise ratio (SINR), or signal to noise ratio (SNR).

As illustrated in table 700 FIG. 7, for an Inter-RAT reselection scenario, a first case (Case 1) may be where the metrics indicate that RF conditions are fairly good in both NR and LTE, but marginally better in LTE than NR. This case may be determined, for example, if the RF metric in LTE is better than NR, but below a threshold (e.g., a configurable threshold set to 5 db). In this scenario, since RF conditions are good in both NR and LTE, but only marginally better in LTE, the benefit of prioritizing the paging message may outweigh the benefit of reselecting to LTE. In other words, it may be worth delaying moving to LTE, in order to ensure the paging message is not missed.

A second case (Case 2) may be where LTE and NR are both in poor RF conditions and LTE is better but, again, only within a threshold value. In this scenario, since RF conditions are poor in both NR and LTE, and only marginally better in LTE, the likelihood of a cell reselection failure may be relatively high. Thus, given the fact that the UE was able to successfully decode the paging message in NR, it may make more sense to prioritize processing the paging message (prioritize an MT call) over reselection, rather than discarding the MT page.

In both of the above cases, although the reselection criteria has been met, based on UE's RF measurements for LTE and NR, the UE can honor the MT page and disregard the reselection procedure.

Figure 8:
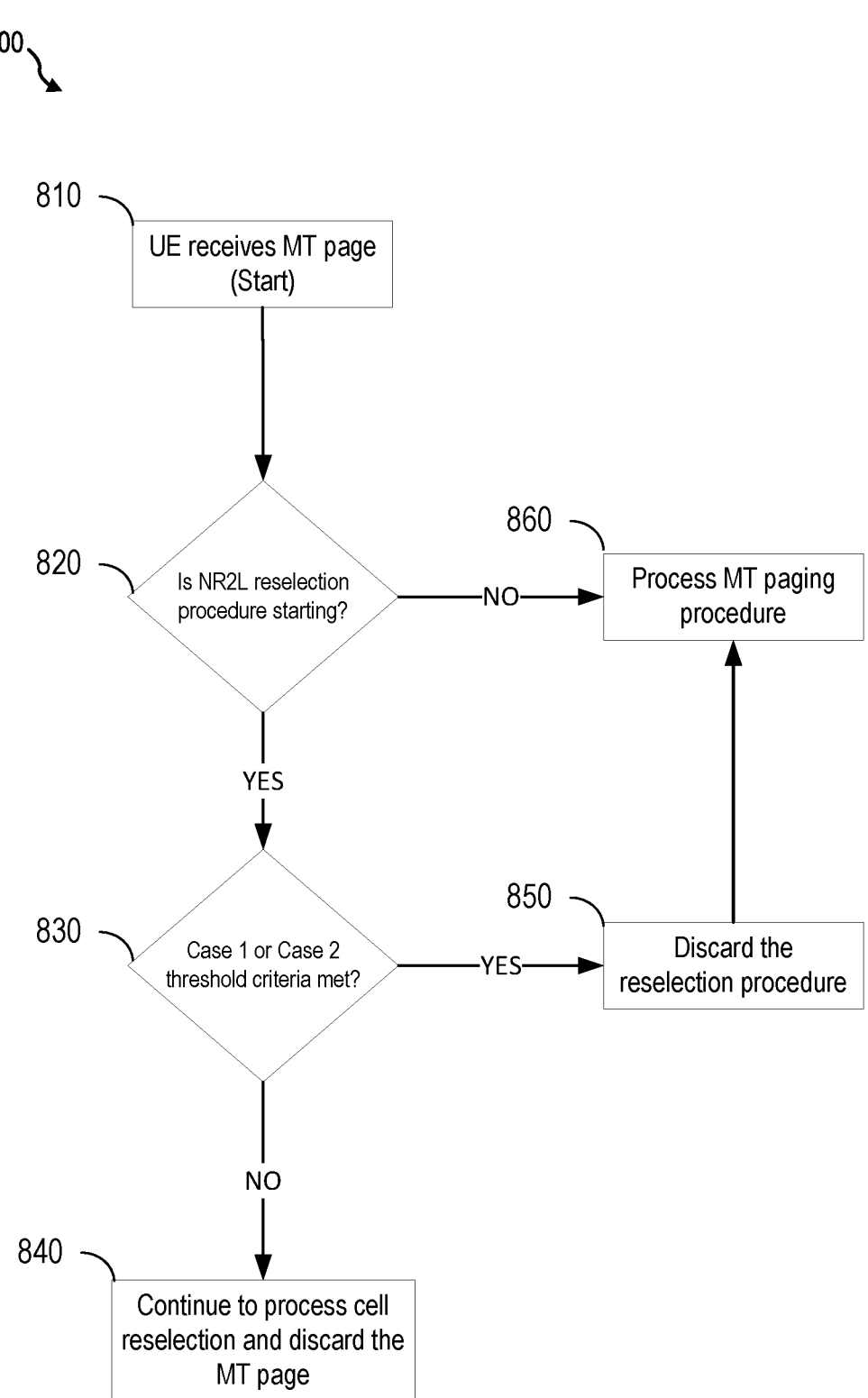
FIG. 8 depicts an example flow diagram for processing paging messages, in accordance with aspects of the present disclosure.

How a UE may prioritize MT paging in the above example cases may be understood with reference to the flow diagram 800 of FIG. 8. At 810, the UE receives an MT page. If a reselection procedure (e.g., an NR2L reselection procedure) has not started (there is no collision), as determined at 820, the UE process the MT paging procedure, at 860.

If there is a collision, and the criteria for Case 1 or Case 2 are met (as determined at 830), the UE discards (terminates) the reselection procedure (at 850) and processes the MT paging procedure, at 860. On the other hand, if the criteria for neither Case 1 nor Case 2 are met, the UE continues to process cell reselection and discards the MT paging message, at 840.

In some cases, it may not be possible to prioritize an MT page over reselection every time. In such cases, a UE may have a mechanism that allows it to track how many times this situation has occurred (e.g., with an NR2L reselection failure coinciding with an MT page). For example, the UE may maintain a counter to track such occurrences. Once the counter value has reached a threshold (e.g., a configurable threshold), the UE may prioritize processing MT paging messages over reselection, at that instance, and reset the counter. Using a counter in this manner may ensure that the UE only delays reselection (to prioritize MT paging) if a history of reselection failures that impact MT paging processing has been observed.

As noted above, in some cases, the UE may buffer a received MT paging message in the event of a collision with a reselection procedure. In such cases, the UE may buffer (e.g., in the RRC layer) the MT paging message until the reselection procedure is completed.

Buffering the paging message in this manner may allow the UE to later process the buffered paging message, in the event of a reselection failure. For example, in the event of an NR2L reselection failure, once the UE is back to NR, the RRC layer of the UE can honor the buffered page, act on it, and pass it to an upper layer/end user. This way when an MT paging collision happens during N2L reselection, the UE may still be able to honor the page and alert the end user about MT call.

The reselection procedure should typically finish within 200-600 msec, which should be well before the next paging cycle. If the reselection procedure is successful, the UE may receive a page in the next paging cycle (in the new cell) and the buffered paging message may be discarded. If the reselection takes longer to complete (and if this time is greater than the UE paging cycle), the UE may continue to use the buffered page.

Therefore, it may be beneficial to maintain a timer (e.g., a configurable timer Wait_Time) that essentially indicates for how long the buffered MT paging message should be retained. This timer may be initiated to a configurable value, when a collision is detected. The configurable value may be determined, for example, based on the UE paging cycle and the expected time for completion of the cell reselection procedure.

Figure 9:
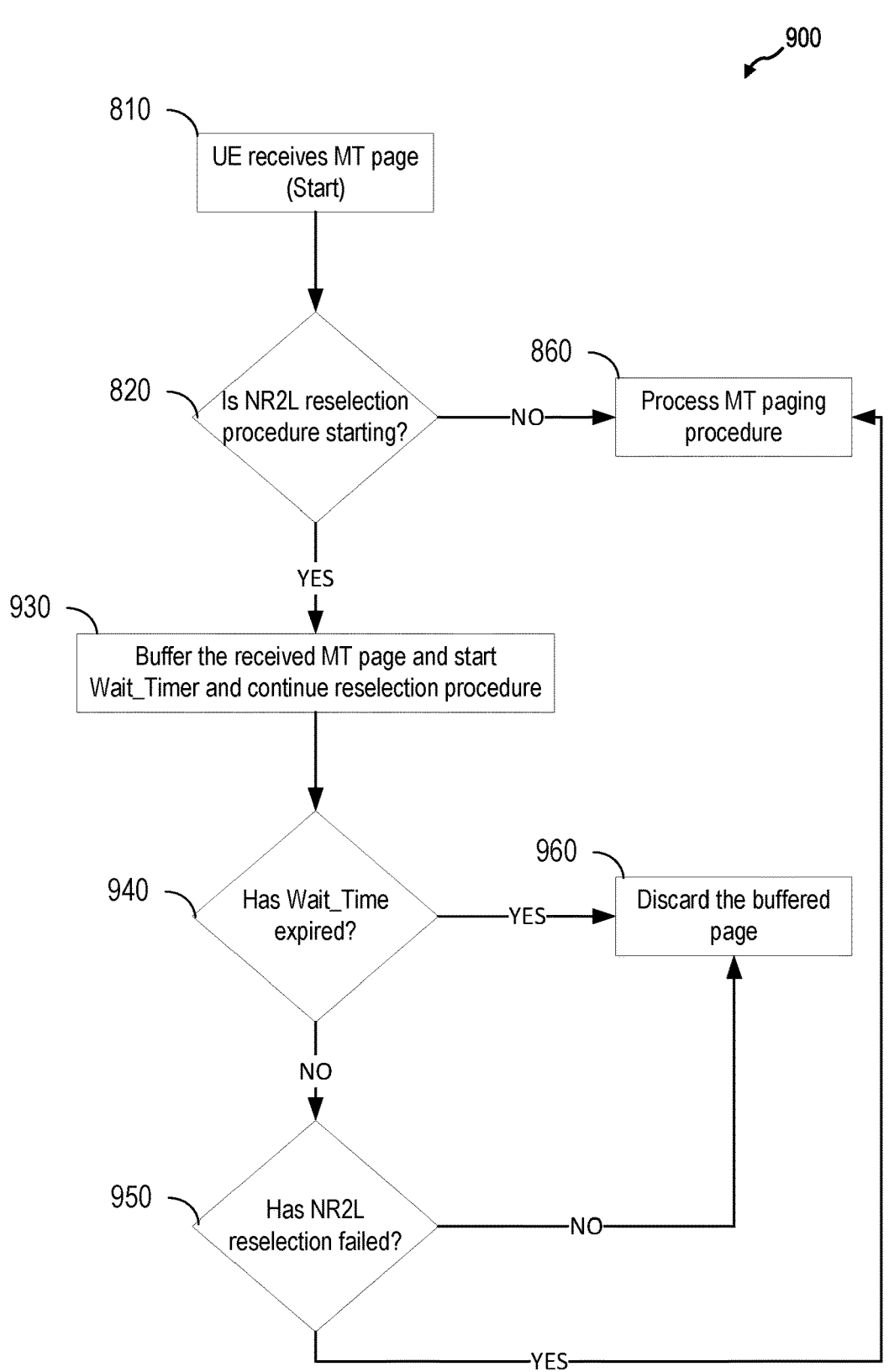
FIG. 9 depicts an example flow diagram for processing paging messages, in accordance with aspects of the present disclosure.

How a UE may utilize a buffered MT paging message may be understood with reference to the flow diagram 900 of FIG. 9.

As illustrated at 930, in the event a collision between a received MT paging message and cell reselection occurs (as determined at 820), the UE may buffer the received MT paging message, initiate a wait timer, and continue the reselection procedure.

If the wait timer expires (as determined at 940) or the reselection procedure is successful (does not fail as determined at 950), the UE may discard the buffered MT paging message, at 960. If, on the other hand, the reselection procedure fails before the wait timer expires, the UE may process the MT paging procedure (using the buffered MT paging message).

In some cases, if the UE moves to LTE after successful completion of an NR2L reselection procedure, the UE may perform a tracking area update (TAU). In such cases, the network may be able to push data (including a page of corresponding information), via the LTE network, to the UE in the same connection for the TAU. In this scenario, the buffered page can be discarded.

Example Operations of a User Equipment

FIG. 10 shows an example of a method 1000 of wireless communication at a UE, such as a UE 104 of FIGS. 1 and 3.

Method 1000 begins at step 1005 with obtaining a MT paging message. In some cases, the operations of this step refer to, or may be performed by, circuitry for obtaining and/or code for obtaining as described with reference to FIG. 11.

Method 1000 then proceeds to step 1010 with performing one or more actions to prioritize processing the MT paging message when one or more reselection criteria for performing a reselection procedure from a first cell to a second cell are met. In some cases, the operations of this step refer to, or may be performed by, circuitry for performing and/or code for performing as described with reference to FIG. 11.

In some aspects: the first cell is associated with a first RAT; and the second cell is associated with a second RAT.

In some aspects, at least one of: one of the first cell and the second cell uses TDD and the other of the first cell and the second cell uses FDD; or one of the first cell and the second cell operates within a first FR and the other of the first cell and the second cell operates within a second FR.

In some aspects, the one or more actions comprise prioritizing processing the MT paging message over performing the reselection procedure.

In some aspects, the method 1000 further includes evaluating RF conditions in both the first cell and the second cell, wherein: at least one of the one or more actions is based on the evaluation. In some cases, the operations of this step refer to, or may be performed by, circuitry for evaluating and/or code for evaluating as described with reference to FIG. 11.

In some aspects: the evaluation comprises comparing a first RF metric for the first cell with a second RF metric for the second cell; and the one or more actions comprise processing the MT paging message and terminating the reselection procedure, if the first RF metric for the first cell is within a first threshold value of the RF second metric for the second cell.

In some aspects, the first threshold value is configurable.

In some aspects, the first RF metric and the second RF metric are at or above a second threshold value.

In some aspects, the first RF metric and the second RF metric are at or below a third threshold value.

In some aspects, the method 1000 further includes maintaining a counter to track a number of times a reselection procedure failure has coincided with reception of an MT page. In some cases, the operations of this step refer to, or may be performed by, circuitry for maintaining and/or code for maintaining as described with reference to FIG. 11.

In some aspects, the one or more actions comprise prioritizing processing the MT paging message over performing the reselection procedure if the counter is at or above a target value.

In some aspects, the one or more actions comprise: buffering the MT paging message; and processing the buffered MT paging message after failure of the reselection procedure.

In some aspects, the one or more actions further comprise: initiating a timer in conjunction with buffering the MT paging message.

In some aspects: the UE processes the buffered MT paging message after failure of the reselection procedure if the timer has not expired; or the UE discards the buffered MT paging message if the reselection procedure is successful or if the timer has expired.

In some aspects, the timer is initiated to a configurable value.

Figure 11:
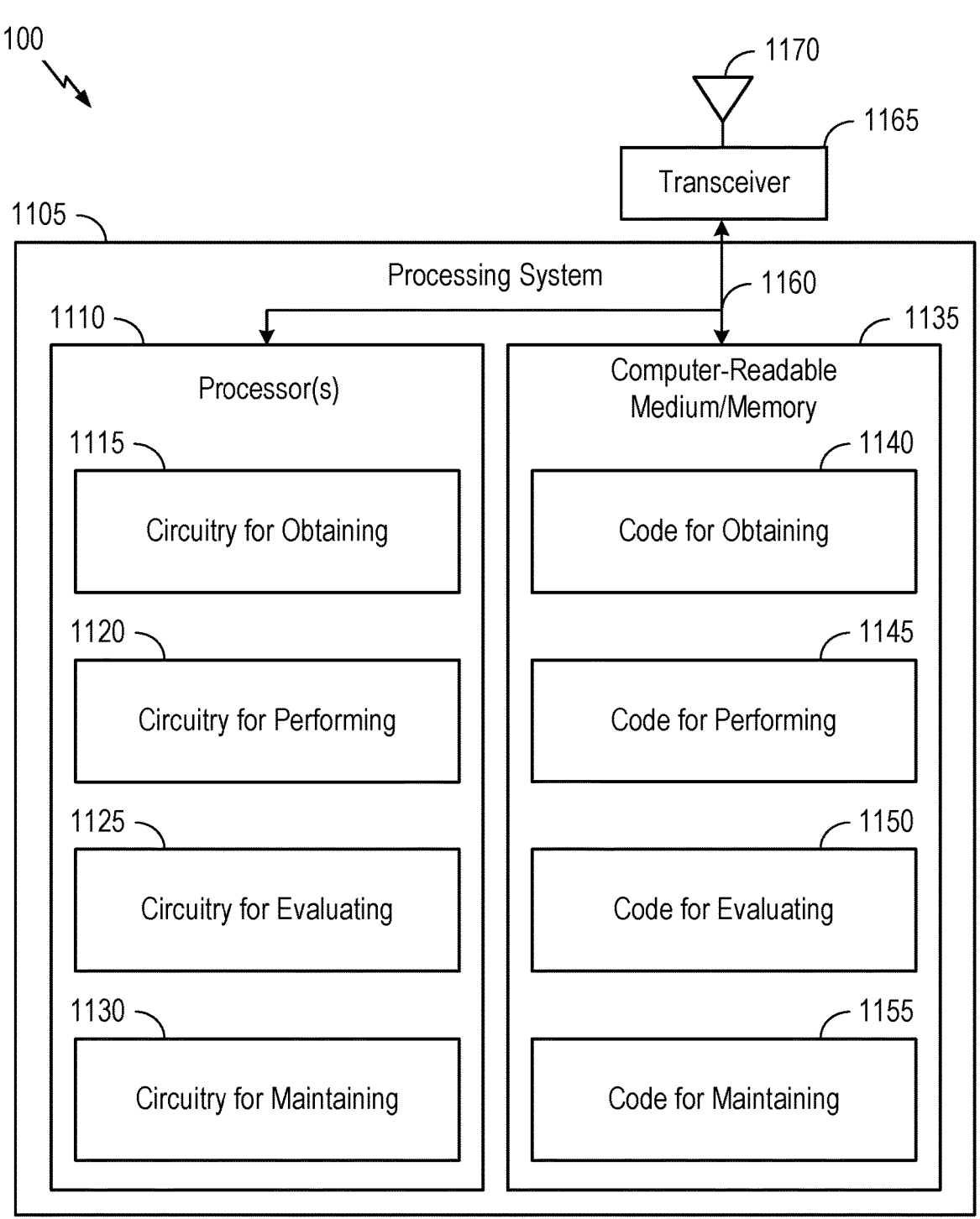
FIG. 11 depicts aspects of an example communications device.

In one aspect, method 1000, or any aspect related to it, may be performed by an apparatus, such as communications device 1100 of FIG. 11, which includes various components operable, configured, or adapted to perform the method 1000. Communications device 1100 is described below in further detail.

Note that FIG. 10 is just one example of a method, and other methods including fewer, additional, or alternative steps are possible consistent with this disclosure.

Example Communications Device

FIG. 11 depicts aspects of an example communications device 1100. In some aspects, communications device 1100 is a user equipment, such as a UE 104 described above with respect to FIGS. 1 and 3.

The communications device 1100 includes a processing system 1105 coupled to the transceiver 1165 (e.g., a transmitter and/or a receiver). The transceiver 1165 is configured to transmit and receive signals for the communications device 1100 via the antenna 1170, such as the various signals as described herein. The processing system 1105 may be configured to perform processing functions for the communications device 1100, including processing signals received and/or to be transmitted by the communications device 1100.

The processing system 1105 includes one or more processors 1110. In various aspects, the one or more processors 1110 may be representative of one or more of receive processor 358, transmit processor 364, TX MIMO processor 366, and/or controller/processor 380, as described with respect to FIG. 3. The one or more processors 1110 are coupled to a computer-readable medium/memory 1135 via a bus 1160. In certain aspects, the computer-readable medium/memory 1135 is configured to store instructions (e.g., computer-executable code) that when executed by the one or more processors 1110, cause the one or more processors 1110 to perform the method 1000 described with respect to FIG. 10, or any aspect related to it. Note that reference to a processor performing a function of communications device 1100 may include one or more processors 1110 performing that function of communications device 1100.

In the depicted example, computer-readable medium/memory 1135 stores code (e.g., executable instructions), such as code for obtaining 1140, code for performing 1145, code for evaluating 1150, and code for maintaining 1155.

Processing of the code for obtaining 1140, code for performing 1145, code for evaluating 1150, and code for maintaining 1155 may cause the communications device 1100 to perform the method 1000 described with respect to FIG. 10, or any aspect related to it.

The one or more processors 1110 include circuitry configured to implement (e.g., execute) the code stored in the computer-readable medium/memory 1135, including circuitry such as circuitry for obtaining 1115, circuitry for performing 1120, circuitry for evaluating 1125, and circuitry for maintaining 1130. Processing with circuitry for obtaining 1115, circuitry for performing 1120, circuitry for evaluating 1125, and circuitry for maintaining 1130 may cause the communications device 1100 to perform the method 1000 described with respect to FIG. 10, or any aspect related to it.

Various components of the communications device 1100 may provide means for performing the method 1000 described with respect to FIG. 10, or any aspect related to it. For example, means for transmitting, sending or outputting for transmission may include transceivers 354 and/or antenna(s) 352 of the UE 104 illustrated in FIG. 3 and/or the transceiver 1165 and the antenna 1170 of the communications device 1100 in FIG. 11. Means for receiving or obtaining may include transceivers 354 and/or antenna(s) 352 of the UE 104 illustrated in FIG. 3 and/or the transceiver 1165 and the antenna 1170 of the communications device 1100 in FIG. 11. In some aspects, means for maintaining, means for performing, and/or means for evaluating may include one or more of the processors illustrated in FIG. 3

Example Clauses

Implementation examples are described in the following numbered clauses:

Clause 1: A method for wireless communications at a UE, comprising: obtaining a MT paging message; and performing one or more actions to prioritize processing the MT paging message when one or more reselection criteria for performing a reselection procedure from a first cell to a second cell are met.

Clause 2: The method of Clause 1, wherein: the first cell is associated with a first RAT; and the second cell is associated with a second RAT.

Clause 3: The method of any one of Clauses 1 and 2, wherein at least one of: one of the first cell and the second cell uses TDD and the other of the first cell and the second cell uses FDD; or one of the first cell and the second cell operates within a first FR and the other of the first cell and the second cell operates within a second FR.

Clause 4: The method of any one of Clauses 1-3, wherein the one or more actions comprise prioritizing processing the MT paging message over performing the reselection procedure.

Clause 5: The method of Clause 4, further comprising: evaluating RF conditions in both the first cell and the second cell, wherein: at least one of the one or more actions is based on the evaluation.

Clause 6: The method of Clause 5, wherein: the evaluation comprises comparing a first RF metric for the first cell with a second RF metric for the second cell; and the one or more actions comprise processing the MT paging message and terminating the reselection procedure, if the first RF metric for the first cell is within a first threshold value of the RF second metric for the second cell.

Clause 7: The method of Clause 6, wherein the first threshold value is configurable.

Clause 8: The method of Clause 6, wherein the first RF metric and the second RF metric are at or above a second threshold value.

Clause 9: The method of Clause 6, wherein the first RF metric and the second RF metric are at or below a third threshold value.

Clause 10: The method of Clause 4, further comprising: maintaining a counter to track a number of times a reselection procedure failure has coincided with reception of an MT page.

Clause 11: The method of Clause 10, wherein the one or more actions comprise prioritizing processing the MT paging message over performing the reselection procedure if the counter is at or above a target value.

Clause 12: The method of any one of Clauses 1-11, wherein the one or more actions comprise: buffering the MT paging message; and processing the buffered MT paging message after failure of the reselection procedure.

Clause 13: The method of Clause 12, wherein the one or more actions further comprise: initiating a timer in conjunction with buffering the MT paging message.

Clause 14: The method of Clause 13, wherein: the UE processes the buffered MT paging message after failure of the reselection procedure if the timer has not expired; or the UE discards the buffered MT paging message if the reselection procedure is successful or if the timer has expired.

Clause 15: The method of Clause 13, wherein the timer is initiated to a configurable value.

Clause 16: An apparatus, comprising: a memory comprising executable instructions; and a processor configured to execute the executable instructions and cause the apparatus to perform a method in accordance with any one of Clauses 1-15.

Clause 17: An apparatus, comprising means for performing a method in accordance with any one of Clauses 1-15.

Clause 18: A non-transitory computer-readable medium comprising executable instructions that, when executed by a processor of an apparatus, cause the apparatus to perform a method in accordance with any one of Clauses 1-15.

Clause 19: A computer program product embodied on a computer-readable storage medium comprising code for performing a method in accordance with any one of Clauses 1-15.

Clause 20: A user equipment (UE), comprising: at least one transceiver; a memory comprising instructions; and one or more processors configured to execute the instructions and cause the UE to perform a method in accordance with any one of Clauses 1-15, wherein the at least one transceiver is configured to receive the MT paging message.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communication, comprising:
at least one transceiver;
one or more memories comprising processor-executable instructions; and
one or more processors configured to execute the processor-executable instructions to cause the apparatus to:
receive, via the at least one transceiver, a mobile terminated (MT) paging message; and
perform one or more actions to prioritize processing the MT paging message when one or more reselection criteria for performing a reselection procedure from a first cell to a second cell are met, wherein, to perform the one or more actions, the one or more processors are configured to cause the apparatus to at least one of:
buffer the MT paging message, initiate a timer in conjunction with buffering the MT paging message, and process the buffered MT paging message after failure of the reselection procedure based on the timer; or
prioritize processing the MT paging message over performing the reselection procedure, wherein to prioritize processing the MT paging message over performing the reselection procedure, the one or more processors are further configured to cause the apparatus to:
evaluate RF conditions in both the first cell and the second cell, wherein to evaluate the RF conditions in both the first cell and the second cell, the one or more processors are configured to cause the apparatus to compare a first RF metric for the first cell with a second RF metric for the second cell; and
process the MT paging message and terminate the reselection procedure, when the first RF metric for the first cell is within a first threshold value of the RF second metric for the second cell.

2. The apparatus of claim 1, wherein:
the first cell is associated with a first radio access technology (RAT); and
the second cell is associated with a second RAT.

3. The apparatus of claim 1, wherein at least one of:
one of the first cell and the second cell uses time division duplexing (TDD) and the other of the first cell and the second cell uses frequency division duplexing (FDD); or
one of the first cell and the second cell operates within a first frequency range (FR) and the other of the first cell and the second cell operates within a second FR.

4. The apparatus of claim 1, wherein the first threshold value is configurable.

5. The apparatus of claim 1, wherein the first RF metric and the second RF metric are at or above a second threshold value.

6. The apparatus of claim 1, wherein the first RF metric and the second RF metric are at or below a third threshold value.

7. The apparatus of claim 1, wherein the one or more processors are further configured to cause the apparatus to:
maintain a counter to track a quantity of times a reselection procedure failure has coincided with reception of an MT paging message.

8. The apparatus of claim 7, wherein the one or more processors are configured to cause the apparatus to prioritize processing the MT paging message over performing the reselection procedure when the counter is at or above a target value.

9. The apparatus of claim 1, wherein the one or more processors are configured to cause the apparatus to:
process the buffered MT paging message after failure of the reselection procedure while the timer is not expired; or
discard the buffered MT paging message when the reselection procedure is successful or when the timer has expired.

10. The apparatus of claim 1, wherein the timer is initiated to a configurable value.

11. A method for wireless communications by a user equipment (UE), comprising:
receiving a mobile terminated (MT) paging message; and
performing one or more actions to prioritize processing the MT paging message when one or more reselection criteria for performing a reselection procedure from a first cell to a second cell are met, wherein performing the one or more actions comprises at least one of:
buffering the MT paging message, initiating a timer in conjunction with buffering the MT paging message, and processing the buffered MT paging message after failure of the reselection procedure based on the timer; or
prioritizing processing the MT paging message over performing the reselection procedure, wherein to prioritizing processing the MT paging message over performing the reselection procedure, comprises:
evaluating RF conditions in both the first cell and the second cell, wherein evaluating the RF conditions in both the first cell and the second cell comprises comparing a first RF metric for the first cell with a second RF metric for the second cell; and
processing the MT paging message and terminating the reselection procedure, when the first RF metric for the first cell is within a first threshold value of the RF second metric for the second cell.

12. The method of claim 11, wherein at least one of:
the first cell is associated with a first radio access technology (RAT) and the second cell is associated with a second RAT;
one of the first cell and the second cell uses time division duplexing (TDD) and the other of the first cell and the second cell uses frequency division duplexing (FDD); or
one of the first cell and the second cell operates within a first frequency range (FR) and the other of the first cell and the second cell operates within a second FR.

* * * * *